Patented Dec. 18, 1945

2,391,315

UNITED STATES PATENT OFFICE 2,391,315

REACTOR

William E. Hulsberg, Chicago, Ill., assignor to Universal Oil Products Company, Chicago, Ill., a corporation of Delaware Application October 20, 1941, Serial No. 415,715

2 Claims. (Cl. 23—288)

This invention relates to an improved form of reactor for conducting conversion reactions in the presence of solid contact material of either a catalytic or noncatalytic nature. The reactor herein provided is particularly advantageous for use in processes, such as the catalytic cracking of hydrocarbon oils, the catalytic dehydrogenation of normally gaseous or normally liquid hydrocarbons and similar endothermic reactions. It is also useful in conducting various exothermic reactions, such as, for example, the regeneration of solid catalyst or contact material upon which deleterious combustible contaminants have been deposited.

In many processes of the nature above mentioned, substantial quantities of heat are carried from the reaction zone in the outgoing stream of gas or vapor and for economical operation it is often necessary to recover a substantial portion of this heat and to utilize the same for the generation of steam or for some other advantageous purpose. In other instances, as applied to endothermic reactions which consume substantial quantities of heat, it is often advantageous to supply heat to the reactants within the reactor wherein said endothermic reaction is taking place, rather than to supply all of the required heat to the reactants prior to their introduction into the reactor. The present invention provides means for accomplishing such heat exchange between a convective fluid and reactants and reaction products within the reactor.

The catalytic cracking and the catalytic dehydrogenation of hydrocarbons are good examples of endothermic reactions which are conducted at relatively high temperatures and consume substantial quantities of heat. The catalysts employed to conduct these reactions become contaminated and relatively inactive after a short period of use by the deposition thereon of deleterious heavy conversion products of a carbonaceous or hydrocarbonaceous nature. It is common practice to burn these deleterious combustible deposits from the catalyst in a stream of hot oxygen-containing gases to restore activity to the catalyst. Such regeneration of the catalyst is an exothermic reaction which liberates substantial quantities of heat at a relatively high temperature level.

It has heretofore been common practice in one type of catalytic cracking operation, for example, to pass a hot convective fluid through the reactor in indirect contact and heat exchange with the catalyst bed or beds disposed therein and with the vaporous hydrocarbon reactants passing through the catalyst bed to supply heat to the endothermic reaction. It is also common practice in this type of catalytic cracking process to pass a relatively cool convective fluid through the reactor wherein regeneration of the catalyst is taking place in indirect contact and heat exchange relation with the catalyst bed disposed therein and the regenerating gas stream passing through the bed, in order to abstract heat from the exothermic reaction and prevent an excessive temperature rise in the catalyst bed which would result in destruction or permanent impairment to the activity of the catalyst.

In another type of catalytic cracking operation, cracking of the hydrocarbon vapors and regeneration of the catalyst is accomplished adiabatically, the heat required for the cracking reaction being supplied to the hydrocarbon reactants prior to their introduction into the reactor in which the catalyst is disposed and useful heat being abstracted from the hot combustion gases resulting from regeneration of the catalyst following their discharge from the reactor.

In the present invention, as applied, for example, to catalytic cracking, the cracking reaction and regeneration of the catalyst are accomplished adiabatically. A portion of the heat required for the cracking reaction may be supplied to the hydorcarbon reactants prior to their introduction into the reactor in which the catalyst is disposed and it is also possible, and is the preferred method of operation, to supply additional heat to the hydrocarbon vapors subsequent to their introduction into the reactor and prior to their contact with the catalyst. Upon regeneration of the catalyst, useful heat is abstracted from the resulting hot combustion gases subsequent to their discharge from the catalyst bed and prior to their discharge from the reactor. This is accomplished by passing a convective fluid through heat exchange elements disposed in a portion of the reactor through which the hydrocarbon reactants pass prior to their contact with the catalyst, while the reactor is employed for conducting the catalytic cracking reaction, and through which combustion gases resulting from regeneration of the catalyst are passed following their discharge from the catalyst bed.

The mode of operation above outlined, which may be conducted in the improved form of reactor provided by the invention, has pronounced advantages over each of the prior methods of operation above outlined. It permits retention of the best features of adiabatic operation and obviates troublesome disadvantages which have one of the tubes 21. The tubes 24 are sufficiently smaller in external diameter than the internal diameter of tubes 21 that annular spaces are provided therebetween. Tubes 24 communicate at their upper ends with header compartment 31 formed by member 28 which is provided with an inlet nozzle 29 communicating with this header compartment.

Outlet nozzle 27 is provided on the side wall 26 of header compartment 30. Convective fluid, admitted to header compartment 31 through nozzle 29, flows downwardly through tubes 24 to their lower ends from which the convective fluid passes into tubes 21 and flows upwardly through the annular space between these tubes and tubes 24 into header compartment 30, from which it is discharged through nozzle 27. This flow may, of course, be reversed, when desired, by employing nozzle 27 as an inlet connection and nozzle 29 as an outlet connection.

By the choice of a cooling or heating medium as the convective fluid passes through the heat exchange tubes 21 and 24, the reactants, conversion products, or the fresh or spent reactivating gases, as the case may be, passing through the central conduit space 32 to or from the catalyst beds may be either heated or cooled, as desired, by indirect contact and heat exchange with the convective fluid flowing through the tubes.

To prevent leakage through the various flanged joints of the reactor, suitable gaskets, not illustrated, may be provided between the flanges or, alternatively, suitable ground joint flanges may be employed. Bolts, not shown, are provided for securing the flanges together.

The construction and arrangement shown in the reactor here illustrated facilitates removal from the reactor for cleaning, inspection and repair or replacement, the entire assembly of heat exchange tubes by simply unbolting the flanged joint between nozzle 19 and header compartment 30 and lifting the tube assembly from the reactor. Also, the bundle of smaller tubes 24 may be independently removed from the reactor and/or from the heat exchanger assembly by simply unbolting the flanged connection at the upper end of heater compartment 30 and withdrawing the small-tubes bundle.

As an example of the utility and operation of the improved form of reactor herein illustrated and described, as applied, for example, to the catalytic cracking of hydrocarbon oils in essentially vaporous state, I preferably employ two or more reactors of the type illustrated and connect the same, through suitable conduits and switching valves not illustrated, for alternate service as zones in which the cracking reaction is conducted and zones in which the regeneration of the catalyst is accomplished, one or more of the reactors being in cracking service while regeneration of the catalyst is taking place in one or more other reactors.

In the reactor being employed for conducting the cracking reaction, the hydrocarbons to be converted enter the reactor in essentially vaporous state through nozzles 16 and 19 and flow downwardly about the tubular heat exchange elements through the conduit space 32. Additional heat required for conducting the cracking reaction, or at least sufficient additional heat to prevent substantial cooling of the hydrocarbon vapors as they pass through the conduit space 32, is supplied thereto from a relatively hot convective fluid passed through the heat exchanger structure in the manner illustrated. The hydrocarbon vapors flow from the central conduit 32 as a plurality of separate streams of substantially equal volume, each at a temperature suitable for accomplishing the cracking reaction upon contact of the vapor with the catalyst, into the spaces 13' between the trays on the inner side of baffles 14. The resulting vaporous conversion products emerge from the catalyst beds on the outer side of baffles 14 and 17 and enter the space 11 between the trays and the shell of the reactor. They flow downwardly through space 11 to the lower portion of the reactor from which they are discharged through nozzle 6 to suitable separating and recovery equipment not pertinent to the present invention and, therefore, not illustrated.

In the reactor being employed as a zone for regenerating the catalyst, suitable regenerating gases, such as, for example, air diluted with combustion gases, enter the reactor through nozzle 6 and flow upwardly through the space 11 between the trays and shell 1 from which they pass as a plurality of separate streams of substantially equal volume into the spaces 13 between the trays and thence into contact with the beds of contaminated cracking catalyst disposed in the trays, the gases entering on the outer side of baffles 14 and 17 and the combustion products emerging from the catalyst bed on the interior side of these baffles into the spaces 13' from which the several streams flow into the central conduit space 32, merging in this zone and being directed upwardly therethrough into nozzle 19 from which they are discharged from the reactor through nozzle 16.

It will, of course, be understood that the flow of reactants, conversion products and fresh and spent reactivating gases may, when desired, be reversed to that above described so as to supply heat to the reactivating gases within the reactor and prior to their contact with the catalyst beds and to abstract heat from the conversion products discharged from the catalyst beds prior to their discharge from the reactor. It is also within the scope of the invention to employ the same path of flow through the reactor and the catalyst beds for the reactants and resulting conversion products as for the fresh and spent reactivating gases, this flow being either in the direction indicated by the arrows in Fig. 1 or in the reverse direction. When the flow is as indicated by the arrows, heat will be abstracted from the outgoing conversion products as well as from the outgoing gaseous products of regeneration following their discharge from the catalyst bed and prior to their discharge from the reactor. When the flow is the reverse of that indicated by the arrows, heat will be supplied to the incoming reactants and to the incoming fresh regenerating gases prior to their contact with the catalyst beds. The flow employed may be chosen to suit requirements, depending upon the particular type of reaction being conducted.

It is also entirely within the scope of the invention to employ a reactor of the type herein provided in processes employing either catalytic or non-catalytic contact material which does not require frequent regeneration and in this instance, as in others, the flow of reactants and resulting products may be as indicated by the arrows or in a reverse direction to either abstract heat from the products following their discharge from the beds of contact material or to supply heat thereto prior to their introduction into the beds of contact material.

Many modifications of the specific form of reactor illustrated may also be employed without departing from the scope of the broader features of the invention. For example, nozzle 19 may be mounted on the lower head instead of the upper head of the reactor with the tubes 21 and 24 projecting therethrough from the header compartments 30 and 31 upwardly into the central conduit space 32. In such cases the conduit space will be left open at its upper and lower ends and nozzle connection 6 will be mounted on the upper head of the reactor outside the space enclosed by baffle 17.

I claim as my invention:

1. A reactor comprising a cylindrical shell, a plurality of annular trays disposed in spaced superimposed relation within said shell and spaced from the inner wall of the shell, the central openings of the annular trays being in vertical alignment to form a passageway in the shell, closure means for one end of said passageway within the shell, a skirt-like baffle depending from an upper one of said trays into the next adjacent lower tray and terminating short of the bottom of said lower tray, heat exchange tubes disposed in said passageway, a fluid inlet adjacent one end of the shell and a fluid outlet adjacent the opposite end of the shell.

2. A reactor comprising a cylindrical shell, a plurality of annular trays disposed in spaced superimposed relation within said shell and spaced from the inner wall of the shell, the central openings of the annular trays being in vertical alignment to form a passageway in the shell, closure means for one end of said passageway within the shell, a skirt-like baffle depending from an upper one of said trays into the next adjacent lower tray and terminating short of the bottom of said lower tray, a heat exchange element disposed in said passageway comprising an outer tube closed at one end and a second tube within and spaced from the outer tube, said second tube being open at the end thereof adjacent the closed end of the outer tube, means for introducing convective fluid to said heat exchange element to flow serially through said tubes, a fluid inlet adjacent one end of the shell and a fluid outlet adjacent the opposite end of the shell.

WILLIAM E. HULSBERG.

Dec. 18, 1945.   T. JENSEN   2,391,316
WRAPPING MACHINE SAFETY MECHANISM
Original Filed June 5, 1941
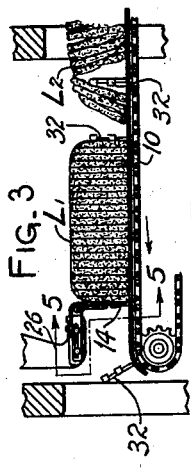
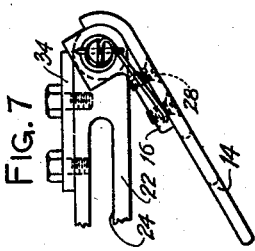
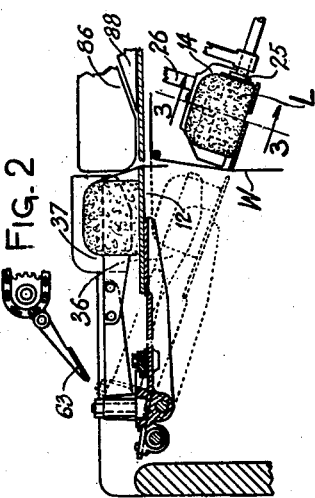
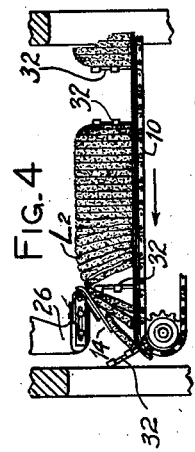
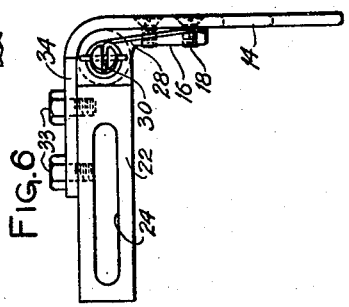
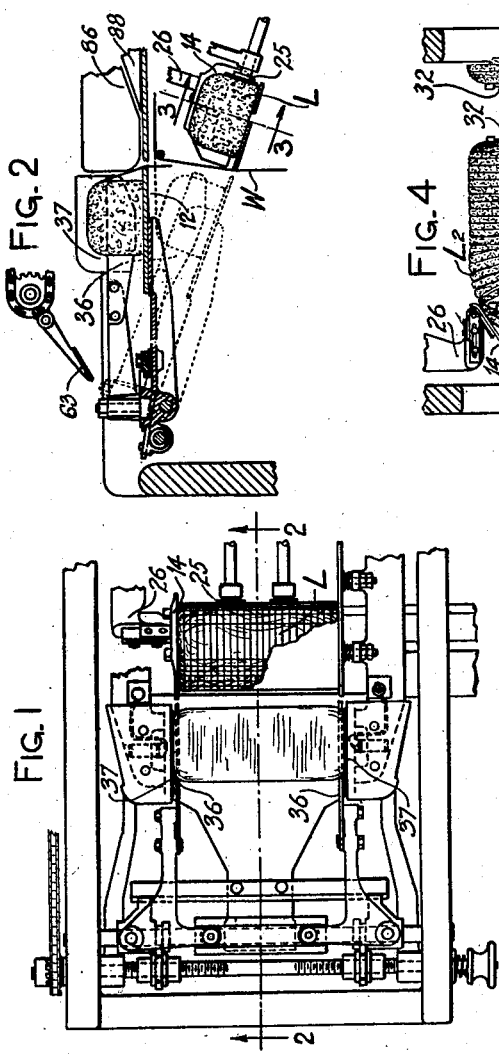
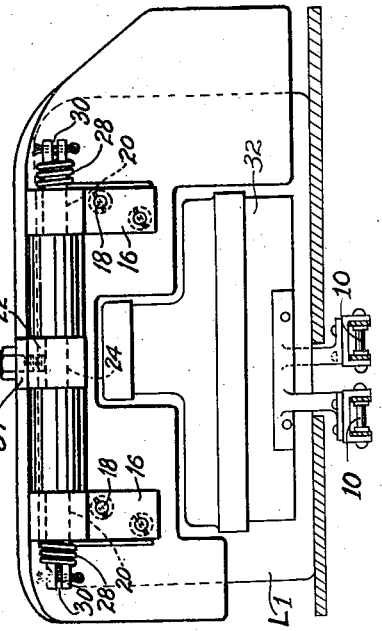
INVENTOR
Thormod Jensen
BY George S. Hastings
ATTORNEY